Sept. 1, 1959 R. B. TILNEY 2,902,051
REVERSING VALVE PARTICULARLY FOR DEEP WELL PUMPS
Filed Nov. 4, 1953 2 Sheets-Sheet 1
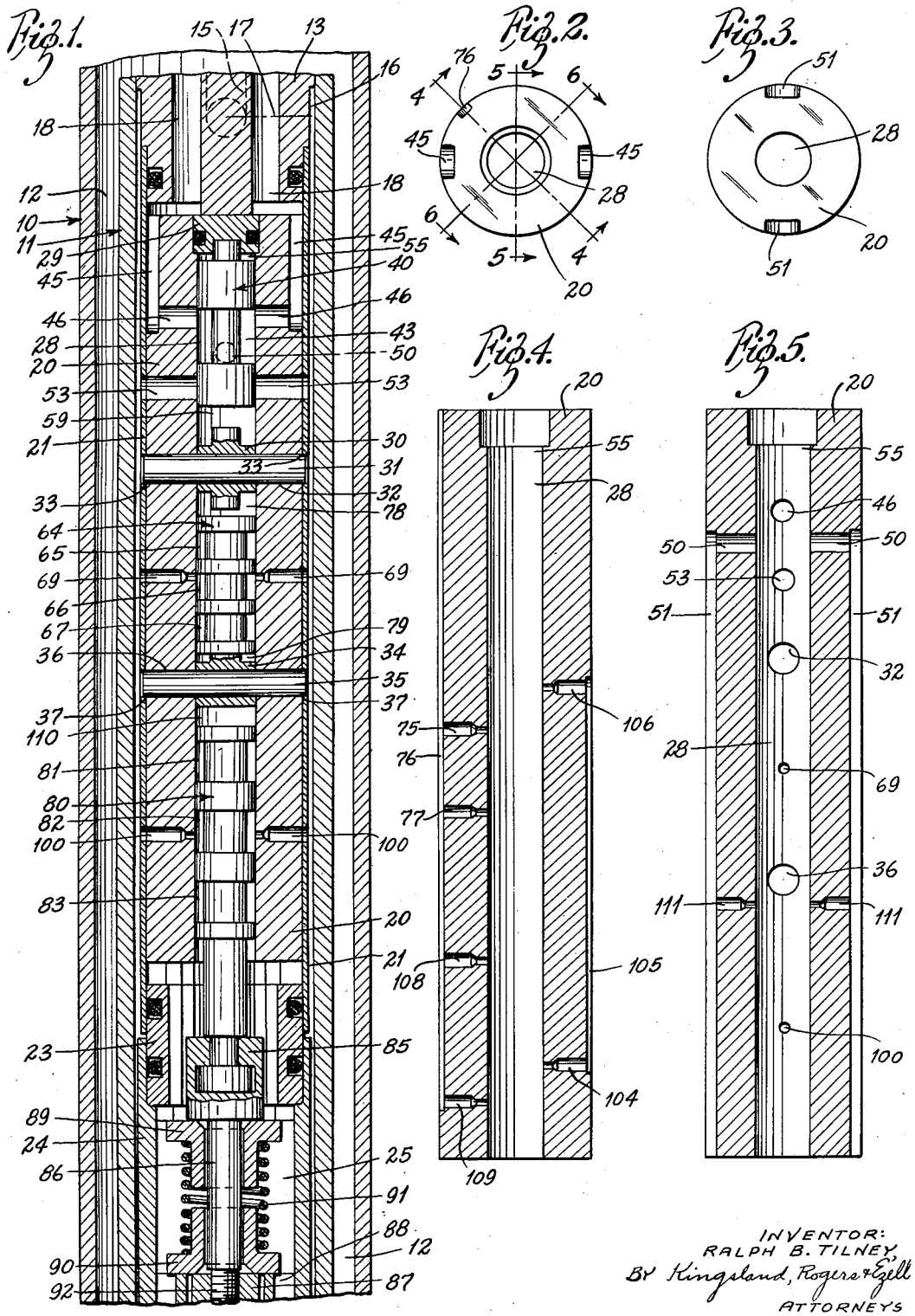
INVENTOR:
RALPH B. TILNEY,
BY Kingsland, Rogers & Ezell
ATTORNEYS Sept. 1, 1959 R. B. TILNEY 2,902,051
REVERSING VALVE PARTICULARLY FOR DEEP WELL PUMPS
Filed Nov. 4, 1953 2 Sheets-Sheet 2
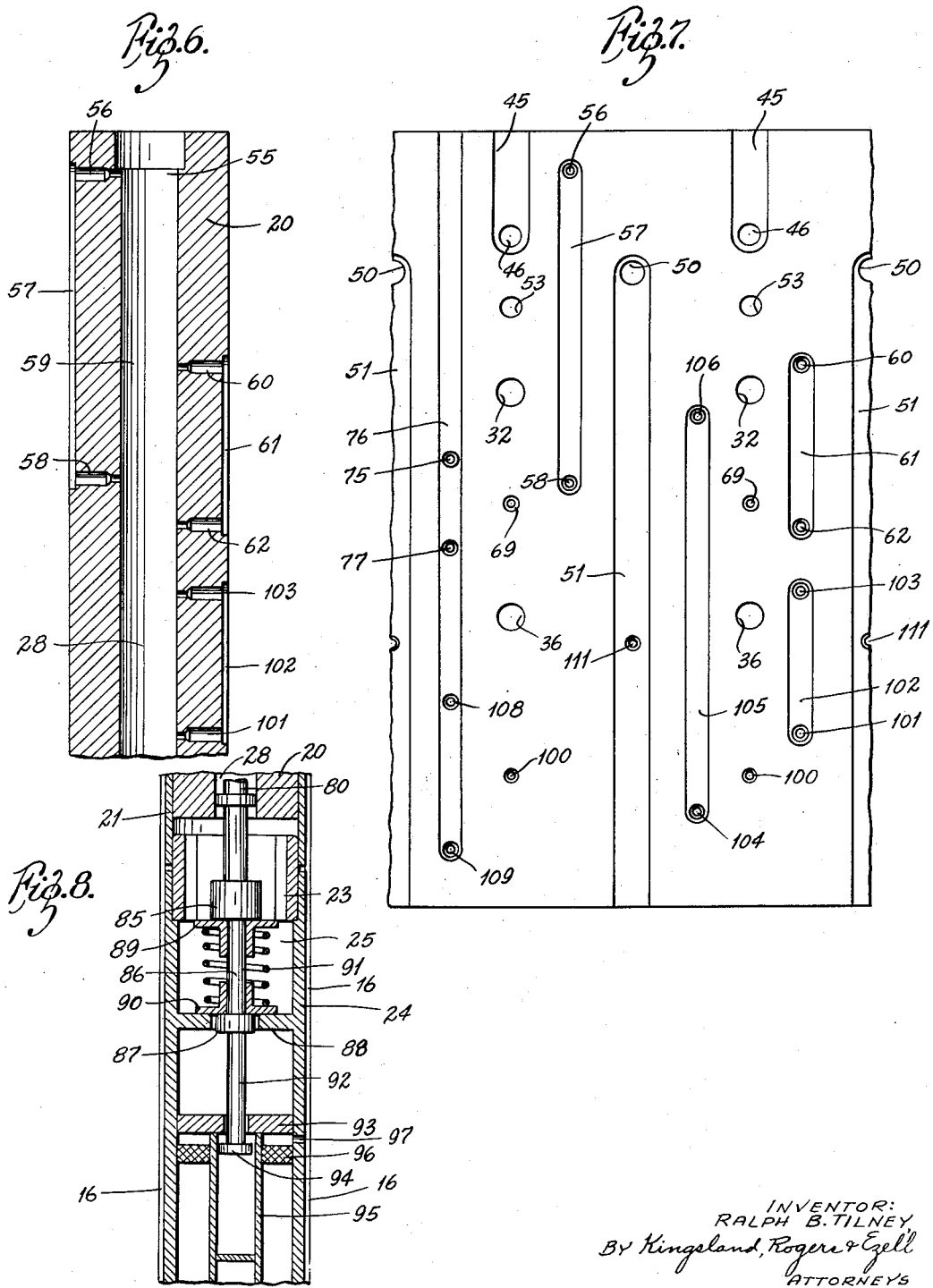
INVENTOR:
RALPH B. TILNEY
By Kingsland, Rogers & Ezell
ATTORNEYS United States Patent Office 2,902,051
Patented Sept. 1, 1959

2,902,051

REVERSING VALVE PARTICULARLY FOR DEEP WELL PUMPS

Ralph B. Tilney, Clayton, Mo., assignor to Alco Valve Company, University City, Mo., a corporation of Missouri Application November 4, 1953, Serial No. 390,196

3 Claims. (Cl. 137—620)

The present invention relates to a valve arrangement that is particularly adapted for use in deep well pumps, although it will be understood that it can have certain other uses.

The valve mechanism is of a type having three valves. There is a hydraulically operated reversing valve designed to port high pressure to an outlet and low pressure to another outlet, and vice versa. This valve may control a reversing hydraulic piston, for example, as used in certain deep well pumps. The reversing valve is controlled through the means of a secondary hydraulically operated valve that alternately ports high and low pressure to the opposite ends of the reversing valve to drive that valve to its opposite positions. The secondary valve is under the control of a primary, double-acting valve. The reversing means, such as the pump piston device, acts directly upon this double-acting valve, moving it oppositely to alternately port high and low pressure to the opposite ends of the secondary valve. Preferably the double-acting valve also normally assumes a neutral position, hydraulically locking the porting to the secondary valve and maintaining such hydraulic locking except at the times when reversing takes place.

A particular application of this valve is disclosed in the application of Roger W. Schoen, Serial No. 373,955, filed August 13, 1953, now Patent No. 2,834,294.

In a broad sense, this type of valve is known in the art. The present inventions relate to novel constructions of the valve assembly by which certain advantages are obtained.

One of the first objects of the present invention is to have a valve assembly of the type above mentioned which can be manufactured readily. To this end, the valve comprises an elongated valve body and a shell initially separate therefrom but finally permanently fitted over the outside periphery of the valve body. The valve body is provided with various ports and surface grooves. The ports and grooves are designed to minimize plugging and cross-drilling. The grooves are closed by application of the shell or sleeve to the outside of the body member.

Another object of the invention is to provide a valve of this character in which the three operating valve members are all in alignment. By this arrangement, the assembly occupies a minimum of space radially, and hence can become a part of a pump of the type used in deep wells. Not only that, the in-line assembly permits the use of a single valve receiving passage that extends from end to end of the valve body and which can be divided into three separate valve chambers by suitable dividers. As will appear, there is a novel construction of these dividers which not only appropriately separates the main bore into several sections, but does so with minimum expense and in a way that subjects the assembly to ready disassembly and repair as well as reassembly.

Other objects will appear from the description to follow.

In the drawings:

Figure 1 is a vertical diametrical section through the valve assembly installed as part of a deep well pump, the well casing being illustrated more or less diagrammatically;

Figure 2 is a top plan view of the valve body member;

Figure 3 is a bottom plan view of the valve body member;

Figure 4 is a diametrical section through the valve body member taken on the line 4—4 of Figure 2;

Figure 5 is another diametrical section through the valve body taken on the line 5—5 of Figure 2;

Figure 6 is still another diametrical section through the valve body taken on the line 6—6 of Figure 2, broken off at the bottom;

Figure 7 is a development of the surface of the body member for the valve assembly; and Figure 8 is a schematic view of operating mechanism for the double-acting valve.

In Figure 1 a well casing is shown generally at 10 and a pump or pump motor barrel is generally indicated at 11, the same being spaced from the well casing 10 so that there is an annular passage 12 in which the oil is forced to the surface by the pumping action.

Within the barrel 11 there is a head 13 only a part of which is illustrated. This head 13 has a passage 15 shown in dotted lines that is adapted to be connected to a source of power oil under pressure and which connects in turn with a space 16 just inside the barrel 11. A dot-and-dash line 17 has been used to represent the connection of the power oil passage 15 with this space 16.

The head 13 likewise has passages 18 that connect with the production oil space 12 and which lead through to the bottom of the head 13. The foregoing parts are not components of the present invention and are illustrated more completely in the Schoen application above mentioned.

The valve of the present invention includes a cylindrical tubular valve body member 20 that is surrounded by a cylindrical valve shell member 21. The shell member extends above the upper end of the valve body member 20 to be fitted over the lower end of the head 13. The shell is of such a diameter as to provide a continuation of the space 16 throughout the length of the valve of the present invention. The lower end of the shell 21 is fitted sealingly onto a connector or adapter 23 that, in turn, is sealingly connected with a neutralizing spring housing 24.

In the particular installation described in the Schoen application above identified, the function of the reversing valve is alternately to connect the space within the bottom of the valve shell below the valve body and within the neutralizing tube 24, alternately to high pressure power oil from the passages 15 and 16, and to low pressure production oil within the space 12. This alternate provision of high and low pressure within the space indicated can be used for operating a motor. In the Schoen application Serial No. 373,955, now Patent No. 2,834,294, the motor in question is a deep well pump operating motor, the piston of which is driven upward by power oil pressure operating below it, and which is driven downward by the power oil pressure acting above the piston. In the pump there illustrated, the power oil remains constantly effective below the piston. However, the upper surface of the piston, which has a greater area, is alternately subjected to power oil and production oil. It will be understood, however, that this particular arrangement of the hydraulic system is not the only one with which the present valve may be used.

The valve body 20 has a central axial bore 28 extending from end to end of the body. The upper end of the bore 28 is closed by a sealing plug 29 with an O-ring as illustrated. About one-third of the way down the valve body 20 there is a divider 30 that is cylindrical in shape so that it will seal within the bore. However, it may be driven out for repair or replacement or for rendering other parts accessible. It is held in place by a pin 31 that is passed through a drilled hole 32 that runs transversely through the valve body 20, and corresponding holes 33 in the shell 21. When the pin 31 is driven out, the divider 30 may be removed. The divider is shown as having cylindrical projections that extend oppositely axially of the bore so as to form limiting abutments for the valve elements to be described.

The upper sealing plug 29 and the divider 30 form an upper or reversing valve chamber, the details of which are yet to be described.

About two-thirds of the way down, the valve body 20 is provided with another divider 34 similar to the divider 30 and similarly held in position by a pin 35 that passes through a drilled hole 36 within the valve body and corresponding holes 37 in the shell 21.

Between the divider 30 and the divider 34 there is a secondary or pilot valve chamber to receive a secondary or pilot valve yet to be described. Below the divider 34 is a primary or double-acting valve chamber to receive a primary or double-acting valve to be described.

Within the top valve chamber there is the reversing valve 40. This valve is provided with two lands between which there is a valve passage 43.

The valve body 20 has two diametrically opposite axial grooves 45 that extend down from the top of the valve body, as illustrated in Figures 1 and 7, and connect with radial passages 46. These grooves 45 are completed into passages by the shell 21. By means of these passages 45 and 46, the production oil space 12 may be in constant communication with the reversing valve chamber. When the reversing valve 40 is up, as illustrated in Figure 1, this communication extends through the valve passage 43 to transverse passages 50 formed into passages by the shell 21. The passages 50, in turn, communicate with peripheral axial grooves 51 formed in the surface of the valve body 20 to be completed into passages by the valve shell 21 when that cylindrical shell is fitted over the valve body. The passages 51 extend to the bottom of the valve body, and thereby communicate with the space 25. So in the position illustrated, the reversing valve provides registry between the space 25 and the space 12.

The reversing valve chamber also has two opposed radial ports 53 through the valve body and the shell. These passages 53 provide continuous communication between the space 16 that constantly receives power oil, and the reversing valve chamber. In the position of the reversing valve 40 illustrated in Figure 1, the lower land obstructs the passages 53. However, when the valve 40 is lowered, the upper land obstructs the passages 46 while the valve passage 43 connects the power oil passages 53 with the passages 50 and 51.

Figure 1 also shows that there is an actuating hydraulic pressure chamber above the reversing valve 40 and another one below that valve. The top chamber 55 is connected by a radial passage 56 at the upper end of the valve body 20 and illustrated in Figures 6 and 7. The passage 56, in turn, connects with a peripheral axial groove 57, closed by the shell 21, that extends downwardly in the periphery of the valve body to another radial passage 58 that connects into the intermediate or secondary valve chamber, as will appear in more detail hereafter. The lower pressure chamber 59 of the reversing valve 40 is connected by a radial passage 60 in the valve body 20 with a peripheral axial groove 61 that, in turn, connects at its other end with a radial hole 62 that also connects into the intermediate or secondary valve chamber. The function of the secondary or pilot valve will be to alternate connecting each of the passages 58 and 62 with power oil under pressure while at the same time connecting the other with production oil within the passage 12. By such arrangement, the secondary valve will hydraulically operate the reversing valve 40.

The secondary valve 64 has four lands providing three valve passages 65, 66 and 67.

There are radial power oil passages 69 in the body 20 and the shell 21 that connect the power oil space or passage 16 outside the shell 21 to the intermediate or secondary valve chamber within the valve passage 66 of the valve 64. The previously described passages 58 and 62 are spaced in opposite directions axially from the passages 69, although angularly spaced as indicated by their appearance in Figure 6. When the valve 64 is up, the valve passage 66 causes the passages 69 to register with the passages 58, to introduce the power oil to the top compression chamber 55 of the reversing valve 40. When the valve 64 is down, as it is illustrated in Figure 1, the valve passage 66 connects the passages 69 with the passage 62 that communicates the pressure oil to the pressure chamber 59 below the reversing valve 40 to lift the latter.

When the reversing valve is to be reversed, power oil must be admitted to the opposite pressure chamber, and the pressure chamber previously subjected to power oil must be exhausted to the production oil passage 12. The secondary valve 64 takes care of this by means of the two valve passages 65 and 67. The valve passage 65 is adapted to connect the passage 58 leading to the top part of the main valve 40 to exhaust in the production oil space 12 when the secondary valve 64 is in its lower position illustrated in Figure 1. When the secondary valve 64 is up, its valve passage 65 connects the passage 58 with a radial passage 75 that connects into an axial groove 76, closed by the shell 21, which leads upwardly to the top of the valve body 20. These passages 75 and 76 constitute an exhaust pressure, or production oil pressure, passage. As the secondary valve 64 rises to its upper position in which it connects the passages 58 and 69 to put power oil above the primary valve 40, it will connect the passage 62 with a passage 77 that connects into the groove 76, whereupon the lower pressure chamber 59 of the main valve 40 is connected to exhaust.

The secondary valve 64 has an upper hydraulic pressure chamber 78 and a lower similar chamber 79 and is hydraulically operated by means of a double-acting primary valve 80. The primary valve is a four-land valve having three valve passages 81, 82 and 83. The primary valve 80 is connected at its lower end into a head 85 within, but not obstructing flow through, the fixed connector 23, which joins the valve shell 21 with the spring cage 24. The stem continues below the head 85, by a part 86 that has a head 87, located adjacent a partition 88 in the tubular element 24. Between the heads 85 and 87 there are two opposite collars 89 and 90, slidable along the stem 86. The two collars 89 and 90 are yieldably urged apart by a coil spring 91, so that they normally engage the bottom of the fixed connector 23 and the partition 88, respectively. This causes the double-acting valve always to be biased yieldingly to a middle position.

Below the head 87 on the valve stem, that stem has a further depending part 92 which must have a length about equal to the stroke of the motor being controlled. The stroke is greatly foreshortened in Figure 8. The stem 92 passes through the motor piston head 93, and below the piston has a lower valve operating head 94 which is enclosed in a tubular part 95 depending from the piston. The tubular part 95 acts as a connecting rod by which the piston may be connected to its work, such as the pump piston. The tube 95 passes through a packing 96 constituting the bottom of the motor cylinder. A port 97 opens through the cylinder wall to admit fluid from the space 16 to below the piston 93, to apply a constant force urging the piston upward. When the piston 93 reaches the lowest part of its stroke, it will engage the head 94 and displace the entire double-acting valve downward, until the piston again moves upward to release the valve. Similarly, when the piston makes the uppermost parts of its stroke, it will move the valve upward. In both cases, the centering spring 91 will return the valve.

The piston assembly has been illustrated diagrammatically to explain a typical use of the valve of this application.

The primary or double-acting valve 80 normally receives power oil pressure from the passage 16 through radial passages 100 in the valve body and shell, which connect into the middle valve passage 82 of the valve 80. When the valve 80 moves upwardly, its valve passage 82 is adapted to connect the power line oil ports 100 with a radial port 101 connecting into a peripheral groove 102 in the valve body 20, which latter is closed by the sleeve 21. The groove 102, in turn, connects into a radial port 103 that leads to the lower pressure chamber 79 of the secondary valve 64.

If the primary valve 80 moves downwardly, its passage 82 connects the power oil ports 100 with a radial port 104, which connects into an axial groove 105 closed by the sleeve 21. The groove 105 connects with the radial port 106 and leads to the upper pressure chamber 78 of the intermediate valve 64.

In the neutral position of the double-acting valve 80, the radial port 101 is blocked by the land above the passage 82. Similarly, the radial port 104 is blocked by the land below the valve passages 82.

In addition to the foregoing power oil connections, there are exhaust connections controlled by the primary valve 80. Lowering the primary valve 80 makes the valve passage 81 connect the radial port 101 with a radial port 108 connecting into the groove 76, which will occur at the same time the radial port 104 is connected to the power oil port 90. When the primary valve 80 is elevated, the passage 104 will be connected with the radial passage 109 leading to the groove 76, through the lower valve passage 83.

In order to prevent obstruction of movement of the primary valve 80, the upper chamber 110 above it is connected by radial passage 111 into the grooves 51 so that there is the same hydraulic pressure above the valve 80 as below it.

*Operation*

In the position of the valves illustrated, the piston 93 can be assumed to have just started an upward stroke and have moved far enough to release the valve 80 to permit it to neutralize under the influence of the spring 91. This condition has the reversing valve 40 in an upper position, which means that the intermediate valve 64 is in a lower position, to which it is locked by the primary valve 80. This primary valve 80 produces a hydraulic lock because the two middle lands block the respective passages to the upper and lower pressure chambers 78 and 79 of the intermediate valve. The lower position of the intermediate valve means that the power oil pressure is admitted to the lower pressure chamber 59 of the primary valve, whereas the upper pressure chamber 55 is connected to exhaust.

The piston 93 will move upwardly. Just before it reaches the upper extreme of its movement it will strike the head 87 on the valve stem, and the final upward movement will displace the valve 80 upwardly. In so doing, the head 87 will lift the collar 90, compressing the spring 91. When the valve 80 moves upwardly, it connects the power oil ports 100 with the radial passages 101 so that power oil is conducted through those passages, the groove 102, the radial passage 103, to the chamber 79 at the bottom of the intermediate valve 64. Simultaneously, the upper chamber 78 of the intermediate valve is ported through the radial port 106, the groove 105, the radial port 104, and the valve space 83 of the primary valve 80, to the radial passage 109 that connects into the exhaust groove 76, which, in turn, is connected to the production oil space 12 at relatively low pressure. This will cause the intermediate valve to move upwardly.

When the intermediate valve 64 moves upwardly, it connects the power oil ports 69 with the radial port 58, which, in turn, connects through the groove 57, the radial port 46, to the upper chamber 55 of the reversing valve 40. Simultaneously, the lower chamber 59 of the reversing valve 40 is connected through the radial ports 60, the groove 61, the radial ports 62, through the valve passage 67, to the radial port 77 that connects into the exhaust groove 76. This then establishes the condition by which the reversing valve 40 is driven downwardly. When it moves downwardly, it disconnects the radial passage 50 from the exhaust passages 46 that ultimately connect into the space 12, and connects the passage 50 with the radial passages 53 that are ported into the space 16 that receives power oil pressure. This means that the passages 50 and the grooves 51 leading to the chamber 25 that is connected to the top of the piston 93 receive power oil pressure. The piston 93 is then driven downwardly and will continue downwardly until it strikes the head 94 on the valve stem, causing a reverse of the above movement.

It can be seen that the present valve cannot hang up in one position permanently. In the first place, the intermediate valve is directly operated by the primary valve, and the intermediate valve must operate before the reversing valve 40 can operate. This sequence of valve operations means that the intermediate valve is normally fully positioned before the reversing valve begins to move, and, as a result, fully establishes the conditions for reversing the reversing valve before the latter can cause the piston itself to be reversed. The intermediate valve 64 produces the effect of a snap action on the reversing valve.

The manufacture and assembly of this valve is made particularly easy. The porting, despite the fact that all of the valve elements are in line, can be done wholly by drilling from the periphery of the valve assembly or valve body 20. All of the axial passages are formed by milling the surface of the valve body 20, and these grooves ultimately are closed by the sleeve 21 which is tightly fitted in place.

When it is necessary to service any of the valves, the whole assembly can be readily taken apart. The plug 29 can be removed readily, this being aided by the use of the O-ring illustrated. After this is done, the reversing valve 40 can be removed. The primary valve 80 can be drawn out of the valve body 20 without difficulty. Driving out either of the pins 31 and 35 permits removal of the separators 30 and 34 and gives access to the intermediate valve 64.

It thus will be seen that a valve arrangement has been provided which is easy to manufacture, compact in radial dimention, and easy to service.

What is claimed is:

1. In a reversing valve assembly: a valve body having a continuous elongated passage therein, one end of the passage opening through the valve body; a first valve at one end of the passage, slidable in said passage and removable through the end of the passage; a removably fixed separator in the passage to separate a first valve chamber for the first valve; a second valve slidably disposed in an intermediate part of the passage and removable through the end of the passage; a second separator removably fixed in the passage above the second valve to separate an intermediate valve chamber; a third valve slidable in the passage above the second separarator; a closure for the passage above the third valve; pressure fluid ports through the valve body, there being one to each valve; exhaust ports through the valve body; passages from the first valve to above and below the second valve, respectively, and a valve passage in the first valve to connect the space above the second valve to the pressure fluid port of the first valve, and a valve passage to connect the space below the second valve to exhaust, said valve being adapted to reverse said connections when the valve is moved in opposite directions; passages in the body from the second valve to above and below the third valve, and valve passages in the second valve to connect one of said passages to the pressure fluid port and the other to exhaust, and vice versa, whereby to reverse the third valve; passages selectively connectible by the first valve to the pressure fluid port thereof, all of said passages comprising straight holes extending inward from the surface of the valve body, with portions formed by grooves along the surface of the body and a shell around the body enclosing the grooves.

2. In a valve construction: a solid elongated valve body having an elongated opening extending from one end into the body, the valve body having a plurality of transverse passages opening into the elongated opening, and a plurality of peripheral axially extending grooves cutting into the outside surface of the body connected with at least one of said transverse passages, and a shell closely fitted around the body to enclose the grooves and form them into passages; a plurality of separate valves slidably disposed in the opening; a fixed separator element secured in the valve body opening between the valves, dividing the opening into a plurality of valve chambers, said element being provided with means securing it to the body without moving the shell.

3. In a valve construction: a solid elongated valve body having an elongated opening extending from one end into the body, the valve body having a plurality of transverse passages opening into the elongated opening, and a plurality of pheripheral axially extending grooves cutting into the outside surface of the body connected with at least one of said transverse passages, and a shell closely fitted around the body to enclose the grooves and form them into passages; a plurality of separate valves slidably disposed in the opening; a fixed separator element secured in the valve body opening between the valves, dividing the opening into a plurality of valve chambers, the separator being removable through the end of the opening without disturbing one of the two valves on its opposed sides; and means removably inserted from the side of the body without moving the shell to engage the separator and hold it in position, said last-named means comprising a pin and the separator body and shell having mating openings to receive the pin.

References Cited in the file of this patent
UNITED STATES PATENTS

| | | |
|---|---|---|
| 2,386,184 | Balsiger | Oct. 9, 1945 |
| 2,426,986 | Dawson | Sept. 9, 1947 |
| 2,497,348 | Ecker | Feb. 14, 1950 |
| 2,566,051 | Avery | Aug. 28, 1951 |
| 2,588,552 | McLeod | Mar. 11, 1952 |
| 2,629,329 | Rose | Feb. 24, 1953 |
| 2,762,342 | Adams et al. | Sept. 11, 1956 |
| 2,834,294 | Schoen | May 13, 1958 |